United States Patent
Gortnar et al.

[15] 3,656,570
[45] Apr. 18, 1972

[54] HYDROSTATIC DRIVE ARRANGEMENT FOR VEHICLES WITH AUTOMATIC ADAPTATION OF CIRCUMFERENTIAL FORCES AND WHEEL SPEEDS TO FRICTION AND CURVATURE CONDITIONS

[72] Inventors: Franc Gortnar; Zarko Zalokar; Fedor Klun; Olga Zalokar; Velena Bulog-Gortnar, all of Ljubljana, Yugoslavia

[73] Assignee: Strojna Tovarna Trbovlje, Vodenska, Trbovlje, Yugoslavia

[22] Filed: Feb. 27, 1970

[21] Appl. No.: 15,138

[52] U.S. Cl. ...................180/6.48, 60/53 R, 180/66 R
[51] Int. Cl. .................................................B62d 11/04
[58] Field of Search..............180/6.3, 6.4 B, 44 F, 66 R; 60/53 R, 97 E

[56] References Cited

UNITED STATES PATENTS

| | | | |
|---|---|---|---|
| 3,344,879 | 10/1967 | Glomb et al. | 180/66 X |
| 3,151,694 | 10/1964 | Rogers | 180/66 X |
| 3,195,669 | 7/1965 | Court | 180/66 |
| 3,355,886 | 12/1967 | Weisenbach | 180/66 X |
| 3,250,340 | 5/1966 | Roberson | 180/44 F |
| 3,506,081 | 4/1970 | Rumsey | 60/53 X |
| 3,256,950 | 6/1966 | De Biasi | 180/44 F |

*Primary Examiner*—Leo Friaglia
*Assistant Examiner*—Leslie J. Paperner
*Attorney*—Karl F. Ross

[57] ABSTRACT

A hydrostatic drive for a vehicle having front and rear wheels with respective driving hydromotors connected to the corresponding right and left wheels, respectively. A main hydraulic pump is connected in hydraulic circuit with the hydromotors while a hydromotor flow distributor lies in circuit the hydromotors and the main pump for the distribution of a hydraulic medium therebetween to adapt the rotary speeds of the individual wheels to road curvature encountered by the vehicle. A further flow distributor is connected between the drive hydromotors of each pair of right and left wheels, and between the respective hydromotors and the corresponding hydromotor flow distributor to individually adapt circumferential force at each wheel to the respective road/wheel friction.

18 Claims, 8 Drawing Figures

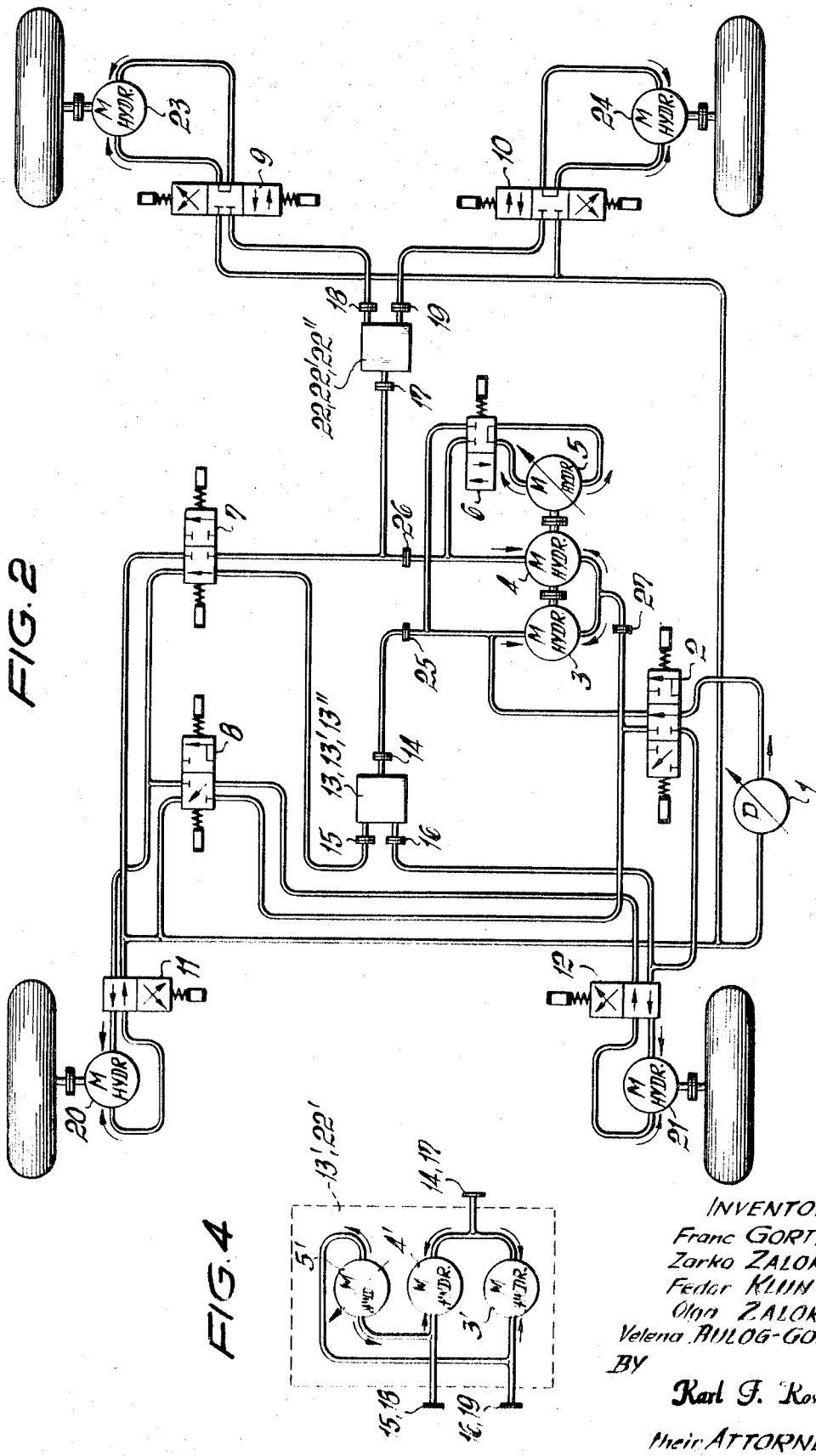

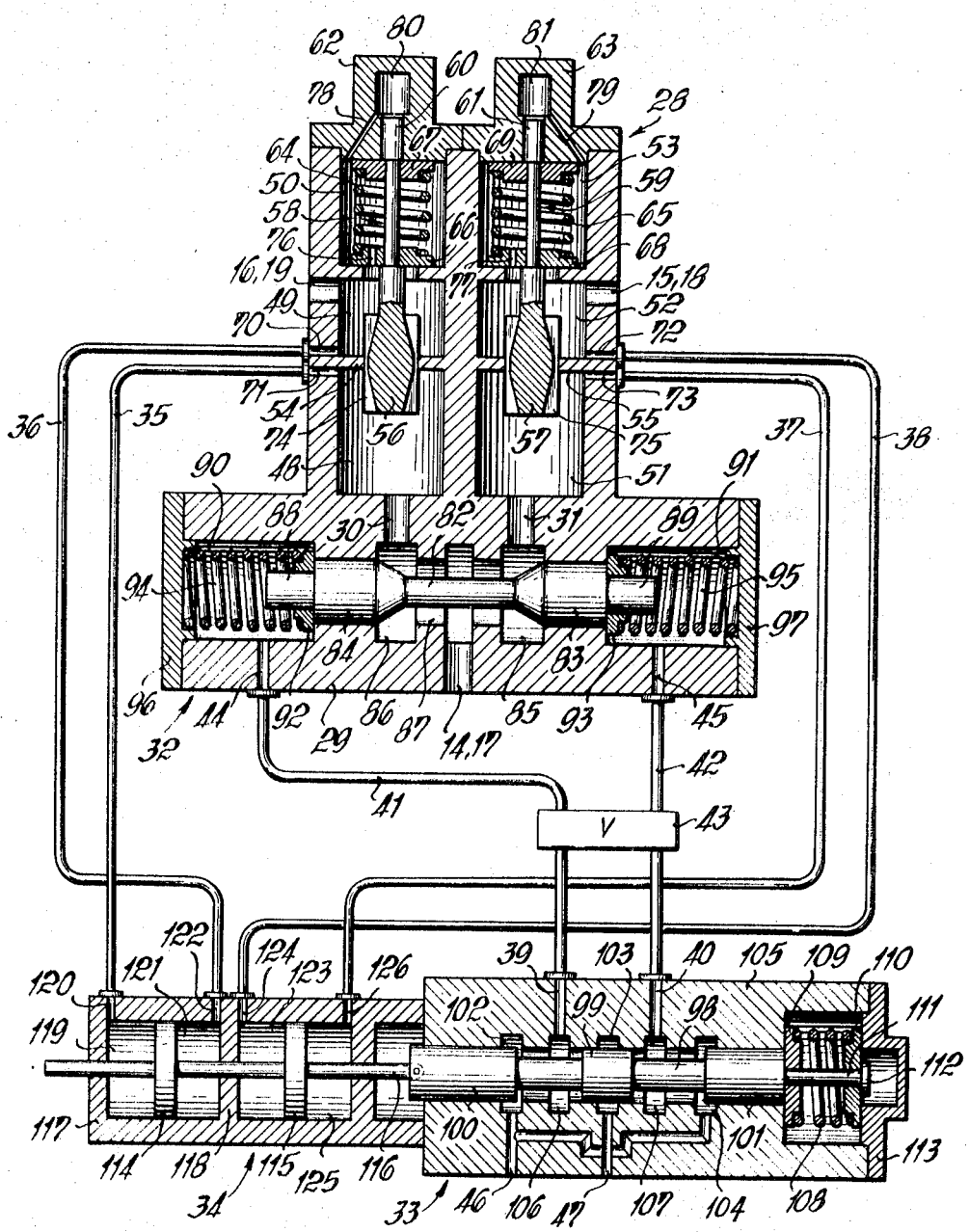

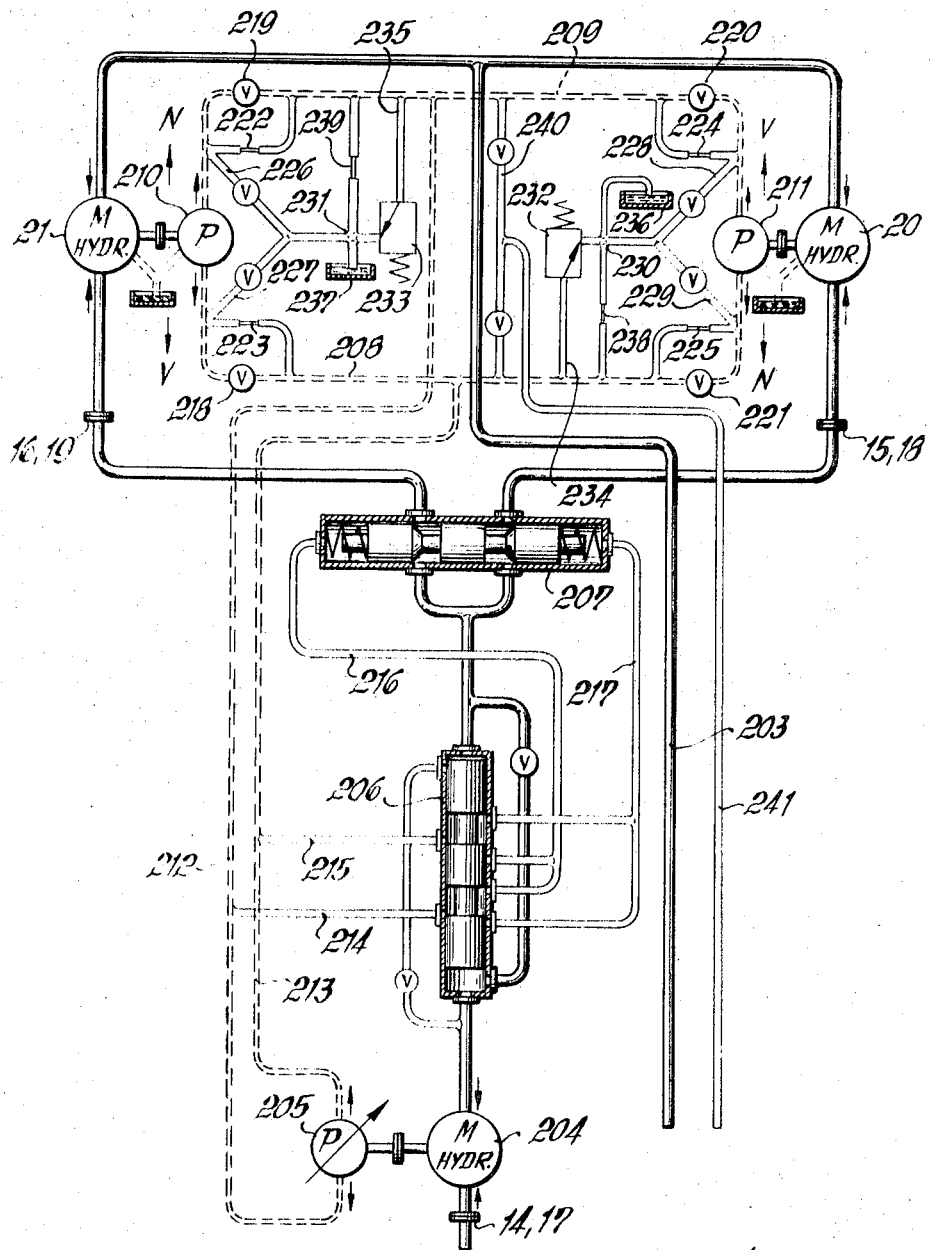

HYDROSTATIC DRIVE ARRANGEMENT FOR VEHICLES WITH AUTOMATIC ADAPTATION OF CIRCUMFERENTIAL FORCES AND WHEEL SPEEDS TO FRICTION AND CURVATURE CONDITIONS

FIELD OF THE INVENTION

The subject of the invention is a hydrostatic drive arrangement for vehicles with automatic adaptation of circumferential forces and wheel speeds to friction and curvature conditions, particularly for heavy automotive machines for earthworking, fitted with tire-equipped wheels.

BACKGROUND OF THE INVENTION

There are known mechanical or combination hydromechanical drives for heavy automotive machines of this kind, in which the problem of vehicle driving and adaptation of circumferential forces of driving wheels to momentary friction conditions of the ground whereupon the vehicle drives and of adaptation to driving in curves is not solved in a satisfactory manner. The known drives mentioned above have the following drawbacks: the efficiency of the hydrodynamic torque converter is very low in the range of high torques and low speeds of the output shaft, i.e. with low speeds and high thrust or traction forces, e.g. of a loader, bulldozer, scraper, or dumper. The engine power is not well utilized in the case when it is most necessary. The consequence thereof is that a more powerful driving engine must be used than is actually required by the machine.

Mechanical differentials utilize the traction forces offered by the friction between the driving wheels and the ground poorly. On building sites or grounds without roads there has to be taken into account that the driving wheels of the vehicle may stand on substrates having differing friction coefficients. A shaft with a mechanical differential can develop only a twofold traction force of the wheel resting on a substrate with a lower friction coefficient although the ground supporting the other driving wheel of the vehicle affords for a greater friction force.

As a consequence thereof, machines with tire-equipped wheels must by 50 percent be heavier than caterpillar (tracked) vehicles in order to realize the same traction forces.

When driving in curves with four-wheel drive vehicles, the wheels of vehicles or machines, respectively, equipped with a rigid chassis and one steering axle sideslide. This phenomenon is attributed to inconvenient geometry of the steering linkage which requires that the wheels of the steering axle run faster than the wheel of the rigid axle. A part of the engine power is thereby consumed for the wear of tires whereby the already low friction coefficient between the ground and the tires low is further reduced due to sidesliding. Beside the excessive wear of tires an unfavorable consequence thereof is the need for a heavier engine than otherwise required. Sidesliding of tires, however, appears not only with machines with a rigid chassis, but also with machines with an articulated chassis. With these machines the drawback mentioned is due to variations of tire radii caused by non-uniform wheel loading.

Thus it must be taken into consideration that driving of scrapers or dumpers is not feasible by single-axle or two-axle tractors on wheels having a single engine. If the rear axle should also be driven, it must be provided with a complete engine drive whereby the machine becomes extraordinarily expensive.

OBJECTS OF THE INVENTION

It is the aim of present invention to remove the drawbacks mentioned in the drives of heavy automotive building machines. Thus the invention has as its task to provide such a drive that has a higher efficiency in the domain of extreme circumferential forces on the wheels than the hitherto known combined hydrodynamical-mechanical speed or ratio changer composed of a hydrodynamic torque converter and a mechanical gear change with gears permanently engaged and with selection of mechanical gears by disk clutches known as "gear change with power shift."

Rotational speeds of individual driving wheels must be mutually independently and automatically adapted to the length of their paths and to various tire radii which arise due to varying wheel loadings during operation.

Circumferential forces of individual driving wheels must also be mutually independent and automatically adapted to variable friction forces which vary in dependance upon varying friction coefficients under individual wheels and upon their varying loadings. These objects are realized by a hydrostatic drive arrangement for vehicles with automatic adaptation of circumferential forces and wheel speeds to friction and curvature conditions with a common control pump and hydromotors for the drive of individual wheels of the vehicle; this arrangement comprises a hydromotor-type flow distributor between the front and the rear axles in the hydraulic circuit at connection points, for the distribution of the hydraulic medium supplied by a main control pump between the group of driving hydromotors of the front axle of the vehicle and the group of driving hydromotors of the rear axle of the vehicle and for adapting the rotational speed of individual wheels of the vehicle to actual curvature conditions. Furthermore, the said hydromotor-type flow distributor is on one hand connected by a pipeline to a valve-type distributor for the distribution of the hydraulic medium between the driving hydromotors of the left-hand and right-hand wheels of the rear axle and for adaptation of the circumferential force of any individual wheel to actual friction conditions, and is on the other hand connected by a pipeline to another valve-type distributor for the distribution of the hydraulic medium between the driving hydromotors of the right-hand and left-hand wheels of the front axle and for adaptation of the circumferential force of the individual wheel to actual friction conditions.

DESCRIPTION OF THE DRAWING

The invention will be explained in detail by some examples, with reference to the accompanied drawing in which:

FIG. 2 is a diagram of an arrangement of a hydrostatic drive of a vehicle with automatic adaptation of circumferential forces and wheel speeds to friction and curvature conditions with a hydromotor-type flow distributor for the distribution of the hydraulic medium between the hydromotor groups of the front and rear axles and two flow distributors for the distribution of the hydraulic medium between the driving hydromotors for the wheels of the front and rear axles, respectively;

FIG. 3 is an axial cross-sectional view of a valve-type distributor for the distribution of the hydraulic medium between the driving hydromotors or groups of driving hydromotors;

FIG. 4 is a diagram of a hydromotor-type distributor for the distribution of the hydraulic medium between the driving hydromotors or groups of driving hydromotors;

FIG. 5 is a diagram, with parts shown is section, of a flow distributor with feeler pumps for the distribution of the hydraulic medium between the driving hydromotors or groups of driving hydromotors;

SPECIFIC DESCRIPTION

Figure 1:
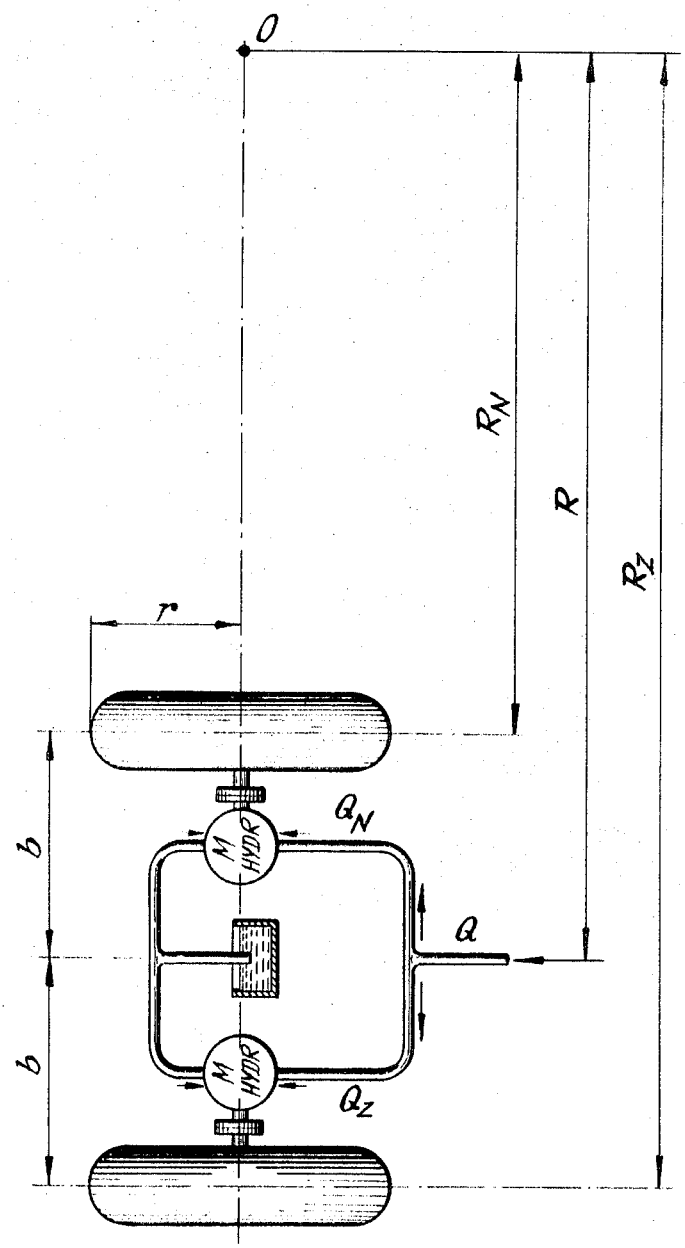
FIG. 1 is a diagram of a hydrostatic drive of individual wheels of one axle of the vehicle, with a parallel hydraulic connection of hydromotors, without an automatic arrangement for the adaptation of circumferential forces and wheel speeds to friction and curvature conditions.

FIG. 1 shows a hitherto known hydrostatic drive of individual wheels on one axle of the vehicle with the hydraulic parallel connection of hydromotors without the arrangement according to the invention for automatic adaptation of circumferential forces and wheel speeds to friction and curvature conditions of the drive. This figure serves for a theoretical presentation of drawbacks of hitherto known hydrostatic drives and for the explanation of theoretical principles of the hydrostatic drive arrangement according to the invention.

It is known that traction forces occurring beneath individual wheels of vehicles or machines for earthworking may exceed the available friction forces due to rapidly varying friction coefficients between various portions of the ground and the tires. In such a case the parallel connection of driving hydromotors of individual wheels is unsatisfactory without additional control devices. The driving hydromotor of a wheel which starts to sideslide rotates quicker than suited to its kinematic conditions. Due to quicker rotation it consumes more oil. Thereby it takes away a part of the oil intended for the other wheel of that axle. Thus the oil pressure diminishes, and the traction force of the machine or the vehicle is reduced. In order to obtain optimum traction forces parallel connection of hydromotors is applied, but for avoiding sidesliding of the wheels, devices must be introduced which maintain a correct flow rate of the hydraulic oil.

With a hydrostatic drive according to FIG. 1, where each individual wheel is rigidly linked to the associated hydromotor, during the drive in a curve the following conditions are observed: If a driving hydromotor in one revolution consumes an oil quantity $q$ and the wheel covers a path of $2\pi r$, then for the rotation around the instantaneous center "0" of rotation the axle consumes the following oil quantity (reference marks according to FIG. 1):

$Q = Q_z + QN = q/2\pi r\ (R+b) + q/2\pi r\ (R-b) = q/\pi r \cdot R$

The difference of quantities for the drive of an outer and an inner wheel is:

$Q_z - QN = q/2\ r\ (R+b) - q/2\ r\ (R-b) = q/\pi r \cdot b$ wherefrom it follows:

$(Q_z - QN)/(Q_z + QN) = b/R$ and $Q_z - QN = b/R\ (Q_z + QN) = b/R\ Q$.

Devices realizing such a distribution of oil flow can be divided into those distributing the oil between the driving hydromotors forcibly, such as hydromotor-type distributors which distribute the oil between the groups of hydromotors of the front and rear axles, and into those supervising the correctness of flow, intervening only in the case when they detect an incorrect run of the motors due to sidesliding of wheels e.g., valve-type distributors, or distributors with feeler pumps distributing the oil between the hydromotors of the same axle.

The hydrostatic drive arrangement for a vehicle with an automatic adaptation of circumferential forces and wheel speeds to friction and curvature conditions in an embodiment with a hydromotor-type distributor for a forced distribution of the hydraulic medium between the groups of driving hydromotors of the two driving axles and with a valve-type flow distributor for the distribution of the hydraulic medium between the driving wheels of each axle is shown in FIG. 2. It comprises a main control pump 1 the pressure side of which is connected to a four-way distributor 2 and a hydromotor-type distributor 3, 4, 5 located in the hydraulic circuit at connection points 25, 26, 27 for the distribution of the entire quantity of the hydraulic medium between the group of driving hydromotors 20, 21 of the front axle and the group of driving hydromotors 23, 24 of the rear axle of the vehicle. Between the circuits connecting one or the other side of the hydromotor-type distributor 3, 4, 5 to the group of driving hydromotors 20, 21 or 23, 24 on the front or rear axles, respectively, on the connection points 14, 15, 16 or 17, 18, 19 a valve-type distributor 13 or 22 is connected for the distribution of the hydraulic medium between the driving hydromotor 20 of the right-hand wheel and the driving hydromotor 21 of the left-hand wheel of the front axle or for the distribution between the driving hydromotor 23 of the right-hand wheel and the driving hydromotor 24 of the left-hand wheel of the rear axle and for the independent adaptation of the circumferential forces of individual wheels to actual friction conditions. The hydromotor-type distributor 3, 4, 5 comprises auxiliary constant-flow hydromotors 3, 4 and a control pump 5 the shafts of which are mechanically interconnected. Thereby the hydromotors 3, 4 on one connection side are connected in parallel to the connection point 27 of the hydraulic circuit, while on the other connection side they are individually connected to connection points 25, 26 of the hydraulic circuit and through the distributor 6 to the first or second pipe connection of the control pump 5, respectively, the flow-control mechanism which is mechanically linked to the steering mechanism of the vehicle.

In the hydraulic circuit of the hydrostatic drive between driving hydromotors 20, 21 of the front axle and the valve-type distributor 13 there are installed distributors 7, 8, 11 and 12, while distributors 9, 10 are installed between the driving hydromotors 23, 24 of the rear axle and the valve-type distributor 22. By shifting into various positions said distributors faciliate the changing of the hydraulic drive into the low, medium or high gears (torque ratios) of driving speed. FIG. 3 shows a detailed embodiment of the valve-type distributor 13 or 22 the arrangement of which in the hydraulic circuit is shown in FIG. 2. The valve-type distributor mentioned comprises a feeler assembly 28 which directly reacts on differences of flow pressures caused by sidesliding of one of the wheels of the front or rear axle, respectively. The feeler assembly 28 is arranged in one part of the common casing 29 and provided with connections 15, 16 or 18, 19, respectively, for the main distributing pipelines for the driving hydromotors of individual wheels on the front or rear axil of the vehicle (FIG. 2) and with channels 30, 31 connecting the feeler assembly to the control throttle distributor 32 arranged in the second part of the common casing 29. In the middle part of the common casing where the throttle distributor is arranged, a connection 14 or 17 is provided for a pipeline interconnecting the distributor 13 or 22 and the hydromotor-type distributor 3, 4, 5 (FIG. 2). Said distributor further comprises a control four-way distributor 33 with a built-in piston servomotor 34 which through connection pipes 35, 36 and 37, 38 is connected to the feeler assembly 28. The four-way distributor 33 comprises connections 39, 40 which through pipelines 41, 42 and a reversing valve 43 are connected in parallel or crosswise to the connections 44, 45 of the control throttle distributor 32. The connection 46 is intended for a pipeline to a not shown control oil tank and the connection 47 for the pipeline to a not shown control-oil supply pump.

The feeler assembly 28 comprises two groups, placed closely together, of successive chambers 48, 49, 50 and 51, 52, 53 where the chambers 48, 49 or 51, 52, respectively, are divided by a partition wall 54 or 55. Each of the partition walls mentioned is fitted with a bore into which protrudes the cylindrical head 56 or 57, respectively, of a movable shutter 58 or 59. The stem 60 or 61 of the cylindrical head protrudes through chamber 50 or 53 and is on its thickened end part guided in cover 62 or 63 and equipped with a pressure spring 64 or 65 supported between plates 66, 67 or 68, 69 which are slidably fitted to the thinner part of the stem 60 or 61. In the intermediate position of the cylindrical head 56 or 57, said supporting plates rest against the partition wall equipped with a bore between chambers 49, 50 or 52, 53 and against the cover 62 or 63, while in the eccentric position they lean against the pertinent thickened part of the stem or against the neck of the cylindrical head 56 or 57 of the movable shutter. Close to the partition wall 54 or 55 on the outer wall of chambers each one of chambers 48, 49 or 51, 52 comprises a pipe connection 70, 71 or 72, 73 for pipelines 36, 35 or 38, 37 leading into the piston servomotor 34. On its mantle the cylindrical head 56 or 57 of the movable shutter 58 or 59 comprises at least one longitudinal slot 74 or 75 the cross-section of which increases continuously from a minimum value in the middle of the length of the cylindrical head towards both ends of the head. The supporting plate 66 or 68 slidably mounted on the stem 60 or 61 of the movable shutter 58 or 59 comprises a bore 76 or 77 for equalization of the oil pressure in chambers 49, 50 or 52, 53. The chamber 80 or 81 in the cover 62 or 63 is by a channel 78 or 79 connected to the chamber 50 or 53 for pressure equalization of both chambers.

The throttle distributor 32 placed in the transverse part of the common casing 29 comprises a piston 82 with tapered piston parts 83, 84 reaching into distribution chambers 85, 86 which are interconnected by a connection channel 87 equipped with a supply connection 14/17 for the connection of the pipeline for the driving hydraulic medium the position of which in the hydraulic network of the hydrostatic drive is shown in FIG. 2. The piston 82 of the distributor has on both ends steps 88, 89 of smaller diameter protruding into chambers 90 or 91 with connections 44 or 45 for the control hydraulic medium the steps have slidably mounted supporting plates 92, 93 which hold one end of the helicoidal pressure spring 94 or 95 resting with its other end on the cover 96 or 97.

The four-way distributor 33 with a built-in servomotor 34 comprises a control piston 98 with an intermediate control element (spool) 99 for the control of flow through the intermediate chamber 103 equipped with a connection 47 for the supply of controlling hydraulic medium and terminal control elements (spools) 100, 101. These terminal elements are intended for the control of flow through end chambers 102, 104 interconnected by a transverse channel which is equipped with a connection 46 for the pipeline of discharging into the tank. On one side of the intermediate chamber 103, the casing 105 comprises a chamber 106 with a supply channel 39 for the control pipeline 41, and on the other side a chamber 107 with a supply channel 40 for the control pipeline 42. To one end the control piston 98 of the distributor has fitted a helicoidal pressure spring 108 placed between the supporting plates 109, 110 slidably mounted on the stem 111 where one of said plates rests against the terminal control element 101 and the other against the limiter 112 whereby, in the intermediate position of the control piston 98 of the distributor, said supporting plate 109 or 110 with its circumferential part rests against the casing 105 or cover 113, respectively.

The piston-type servomotor 34, which is mounted at one lateral side of the four-way distributor 33, comprises pistons 114 and 115 which are mutually spaced and fixed to the piston rod 116 which on one side is articulated to the control piston 98 of the four-way distributor, and a cylinder-shaped casing 117. A partition wall 118 divides this casing into two separate chambers whereby the piston 114 in the first chamber divides the latter into a compartment 119 equipped with a connection channel 120 for the pipeline 35 and a compartment 121 equipped with a connection channel 122 for the pipeline 36, while the piston 115 in the other chamber divides the latter into a compartment 123 equipped with a connection channel 124 for the pipeline 38 and a compartment 125 equipped with a connection channel 126 for the pipeline 37.

A second embodiment (FIG. 4) of the hydrostatic drive arrangement for vehicles with automatic adaptation of circumferential forces and wheel speeds to friction and curvature conditions has an identical arrangement of particular assemblies as described above and shown in FIG. 2, with the only difference that the distributor for the distribution of the driving hydraulic medium between the driving hydromotors 20, 21 or 23, 24 of the front or rear axle of the vehicle across connection points 14, 15, 16 or 17, 18, 19 a hydromotor-type distributor 13' or 22' is connected instead of valve-type distributors (FIG. 2). As obvious from FIG. 4, a hydromotor-type distributor 13' or 22' consists of a first and a second auxiliary hydromotor 3', 4' and a control pump 5' the shafts of which are mechanically interconnected. The auxiliary hydromotors 3', 4' are on one connection side connected in parallel by a pipeline to connection points 14 or 17 of the hydraulic circuit, and on the other connection side each is separately connected to connection points 15 or 16 and 18 or 19 of the hydraulic circuit and to the first or second pipe connection of the control pump 5'.

A further embodiment (FIG. 5) of the hydrostatic drive arrangement for vehicles with automatic adaptation of circumferential forces and wheel speeds to friction and curvature conditions comprises a similar arrangement of assemblies as the two embodiments described and shown in FIG. 2, with the difference that for the flow distribution of the driving hydraulic medium between the driving hydromotors 20, 21 or 23, 24 of the front or rear axles, respectively, it comprises a flow distributor 13" or 22" with feeler pumps (FIG. 5), connected to connection points 14, 15, 16 or 17, 18, 19, whereby each individual driving hydromotor 20 or 21 of the front axle of the vehicle is mechanically connected to the feeler pump 211 or 210, and in the same way the individual hydromotors 23 or 24 of the rear axle are mechanically connected to pertinent feeler pumps. The embodiment of flow distributor 13" with feeler pumps intended for the distribution of the hydraulic medium between the driving hydromotors 20, 21 of the front axle of the vehicle and that of the flow distributor 22" with feeler pumps are identical.

The flow distributor 13" with feeler pumps shown in FIG. 5 comprises a constant-flow hydromotor 204 which is in the driving hydraulic circuit through a direction distributor 206 and a throttle distributor 207 connected in parallel to one side of the driving hydromotors 20, 21 of the front axle of the vehicle, while their other sides are mutually connected by a pipe from which a pipe 203 is branched for the connection to the driving pump. The hydromotor shaft is mechanically linked to the control pump 205 which for obtaining changes of flow is mechanically connected to the steering mechanism for the wheels; the control pump also has and by pipelines 212, 213 inserted into the control circuit which by pipe branches 208, 209 connects the feeler pumps 210, 211 the shafts of which are mechanically linked to the shafts of the driving hydromotors. The control pump 205 is, through pipelines 212, 213 and pipe branches 214, 215, connected to the direction valve 206 which has its extreme double outlet pipe sections connected to the feed pipe 216 or 217 each of which is connected to one end of the throttle valve 207. In connection pipeline sections 208, 209 for the feeler pump 210 or 211 nonreturn valves 218, 219 and 220, 221 are placed blocking in the direction towards the feeler pump.

In parallel with the non return valves mentioned throttle valves 222, 223 or 224, 225 are inserted into by-pass pipelines. Pipe branches 226, 227 or 228, 229, respectively, connected to connection pipeline sections of the feeler pump 210 or 211 are provided with nonreturn valves which open towards the feeler pump 210 or 211, unite behind the nonreturn valves into a common pipeline which through a pipe cross-joint 231 or 230 leads to a relief valve 233 or 232 connected by a connection pipe 235 or 234 to branch 209 or 208 of the control circuit. The pipe cross-joint 230 or 231 is on one side connected to the oil tank 236 or 237 and on the other side through a throttle 238 or 239 to branch 208 or 209 of the control circuit, whereby said branches are in their centers interconnected by a pipeline 240 provided with the pertinent valves and connected to a common feeder pipe 241 for the control circuit.

OPERATION

Figure 6:
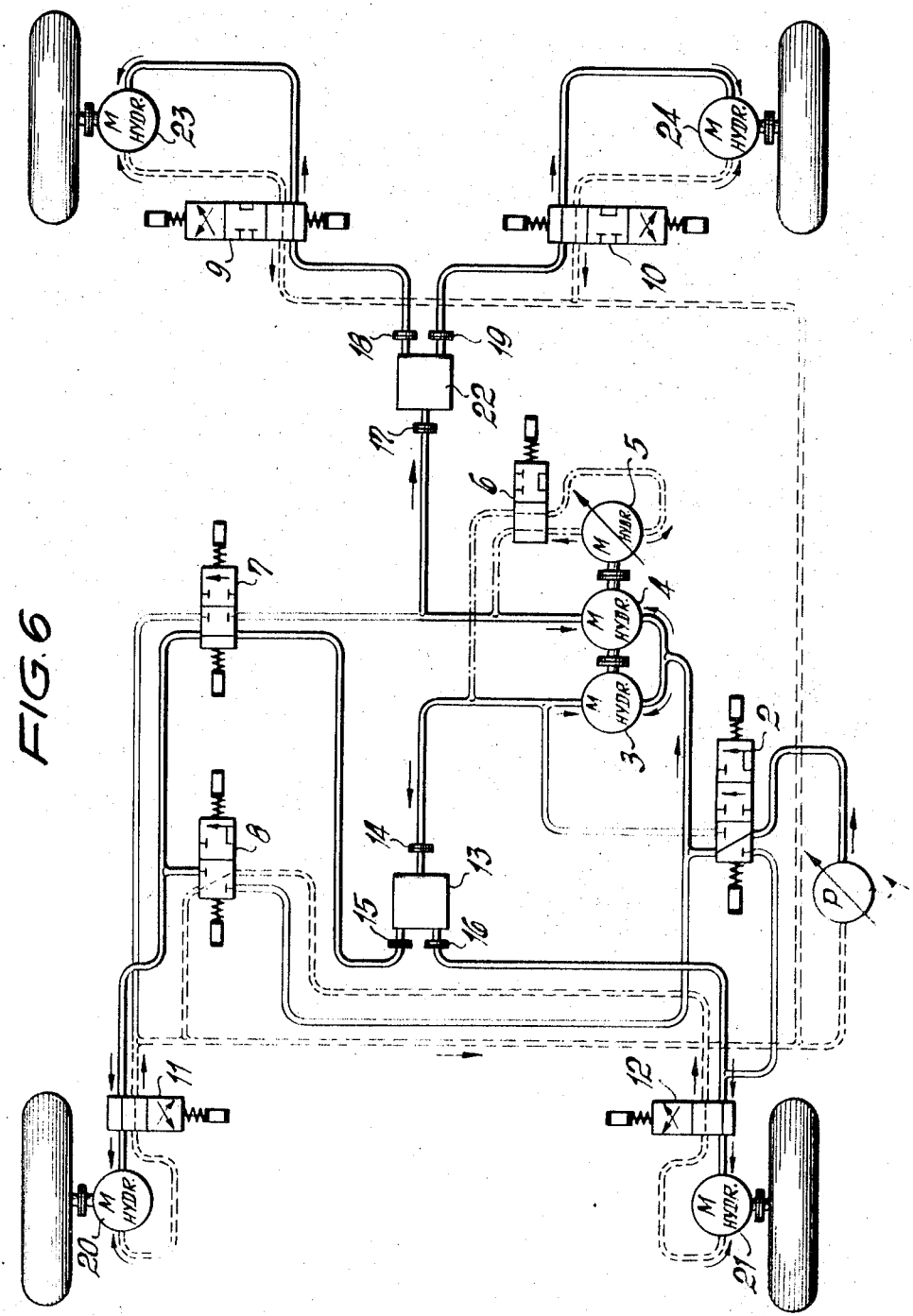
FIG. 6 is a flow circuit of a hydrostatic drive arrangement for a vehicle with automatic adaptation of circumferential forces and wheel speeds to friction and curvature conditions for driving in low gear (speed)

FIG. 6 shows the circuit of the hydrostatic drive arrangement with automatic adaptation of circumferential forces and wheel speeds to friction and curvature conditions when driving in low gear. In order to faciliate examination, in the diagram the supply pipelines are drawn with heavy solid line, while return pipelines are drawn with a heavy broken line. In low gear where the vehicle drives with minimum speed all four driving hydromotors 20, 21, 23, 24 are by the hydraulic circuit connected in parallel to the main control pump 1. The pressure side of the main control pump 1 is connected through the four-way distributor 2 by a pipeline in parallel to one side of each of the auxiliary hydromotors 3, 4 of the hydromotor-type distributor. The shafts of the two auxiliary hydromotors are mechanically interconnected so that they distribute the hydraulic medium in equal quantities to the groups of the driving hydromotors of the front and rear axles. Also firmly connected with the shafts of both auxiliary hydromotors is the hydraulic control pump 5 the control mechanism of which is mechanically connected with the steering mechanism for the wheels. The hydraulic control pump 5 has, with the vehicle driving straight ahead, an eccentricity "0" whereby in such a control position the supply of the control pump equals zero. As soon as the vehicle enters a curve, the steering axle covers a longer path and consumes more oil. In order to prevent sidesliding the oil supply for the group of driving hydromotors on the steering axle must be increased. This increase of oil supply is realized by pump 5. When driving in a curve, the pump 5 draws oil from the pipeline connecting the hydromotor 4 to the valve-type distributor 22 for the rear axle of the vehicle, supplying it to the pipeline connecting the hydromotor 3 and the valve-type distributor 13 for the front axle of the vehicle in the case the front axle is used as steering axle.

The oil flows from the hydromotor 3 to the valve-type flow distributor 13 which distributes the oil between connection points 15, 16. Further the oil flows from the connection point 15 through four-way distributors 7 and 11 to the driving hydromotor 20 of the right-hand front wheel from which it returns through the return pipeline shown by a dotted line in the diagram and passes through the four-way distributor 11 to the suction pipe of the common control pump 1. From the connection point 16 the oil flows through the four-way distributor 12 to the driving hydromotor 21 of the left-hand front wheel wherefrom it passes through the return pipeline shown by a dotted line in the diagram through the four-way distributor 12 and through the four-way distributor 8 into the return pipeline connected to the suction pipe of the common control pump 1.

From the hydromotor 4 the oil flows to the valve-type flow distributor 22 connected to connection point 17 and distributing the oil between connection points 18 and 19. Then the oil flows from the connection point 18 through the four-way distributor 9 to the driving hydromotor 23 of the right-hand rear wheel wherefrom it returns by the return pipeline through the four-way distributor 9 to the suction pipe of the main control pump 1. From the connection point 19 of the distributor 22 the oil flows through the four-way distributor 10 into the driving hydromotor 24 of the left-hand rear wheel and it returns therefrom through the return pipeline passing through a four-way distributor 10 into the suction pipe of the main control pump 1.

Figure 7:
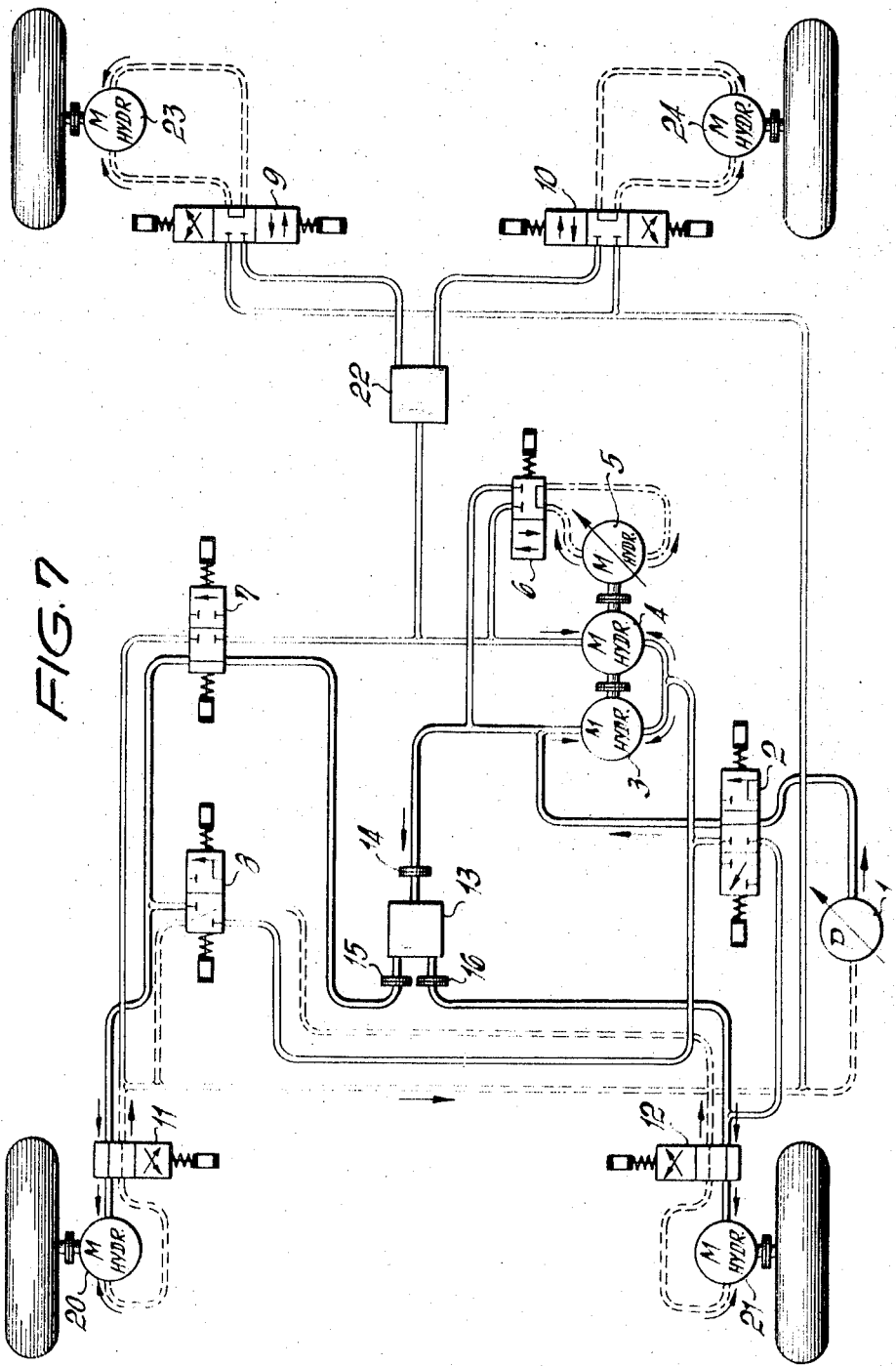
FIG. 7 is a flow circuit of a hydrostatic drive arrangement for a vehicle with automatic adaptation of circumferential forces and wheel speeds to friction and curvature conditions for driving in medium gear (speed)

FIG. 7 shows the circuit of the hydrostatic drive arrangement for vehicles according to present invention when driving in middle gear. For this circuit also there are in the diagram the supply pipelines shown by solid heavy lines and the return pipelines by heavy dotted lines. In middle gear only the hydromotors 20, 21 of the front axle of the vehicle are connected to the main control pump 1, and in parallel. In this gear the distributors 2, 6, 9 and 10 are shifted to the position of the middle gear, whereby the pressure oil flows from the main control pump 1 through a four-way distributor 2 into the valve-type distributor 13 which distributes the oil between the connection points 15, 16. From the connection point 15 oil flows through four-way distributors 7, 11 into the driving hydromotor 20 of the right-hand front wheel wherefrom it returns after having performed its operation through the four-way distributor 11 into the suction pipe of the main control pump 1. From the connection point 16 the oil flows through the four-way distributor 12 into the driving hydromotor 21 wherefrom it returns after having performed its operation through the four-way distributors 12 and 8 into the return pipeline connected to the suction pipe of the main control pump 1. Thereby the circuit of the driving hydromotors of the rear, not driven axle, is short-circuited by connecting both connection pipelines of the hydromotor 23 in the four-way distributor 9 and connecting both connection pipe-lines of the hydromotor 24 in the four-way distributor 10. In this gear the control pump 5 appertaining to the hydromotor-type distributor has no function as it is also short-circuited through the distributor 6.

Figure 8:
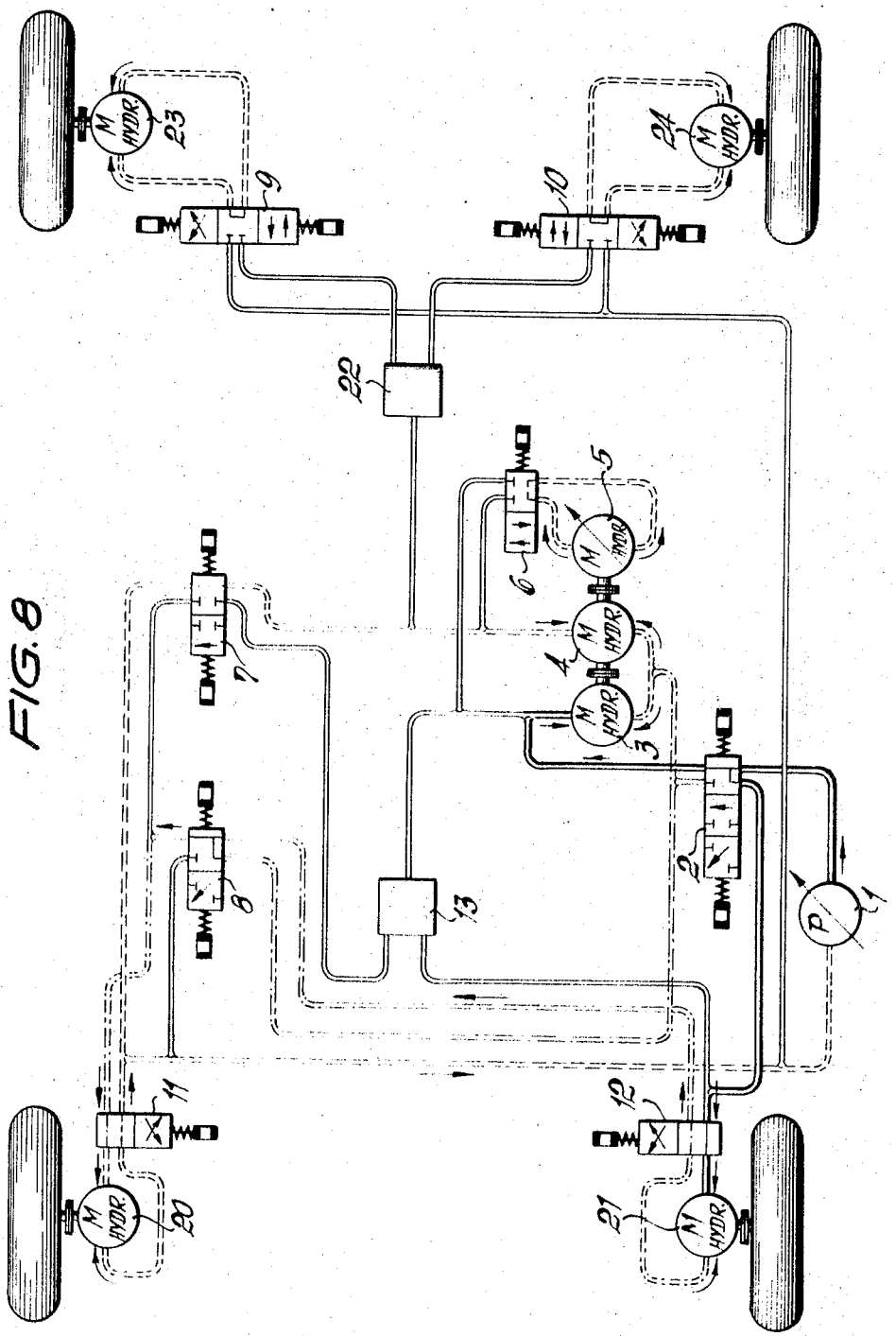
FIG. 8 is a flow circuit of a hydrostatic drive arrangement for a vehicle with automatic adaptation of circumferential forces and wheel speeds to friction and curvature conditions for driving in high gear (speed).

FIG. 8 shows the circuit of the hydrostatic drive arrangement for vehicles according to present invention when driving in high gear. For better survey, pipelines of oil which had partly accomplished its operation are drawn in dash-dotted lines, while the return pipelines are drawn in dot lines.

In high gear, i.e. at top speed of the vehicle, only the driving hydromotors 20, 21 of the front axle are series connected to the main control pump 1. With the circuit of FIG. 8, the two driving hydromotors in spite of their series arrangement are not supplied by equal oil quantities because they are connected to a hydraulic differential. This is the reason why the vehicle renders good driving properties in curves. With the positions of distributors 2, 6, 7, 8, 11, 12, 9, 10 according to FIG. 8 the higher gear is thrown in, whereby oil from the main control pump 1 is led through the four-way distributor 2 from the latter a major oil quantity is led through the four-way distributor 12 into the driving hydromotor 21 of the left-hand front wheel of the vehicle where it gives up approximately one-half of its energy and then flows at half pressure through a pipeline which is shown in dash-dotted lines in the diagram and then through four-way distributors 12, 8, 11 into the second series-connected driving hydromotor 20 of the right-hand wheel of the front axle. Therefrom the main oil quantity returns through the distributor 11 and then through the return pipeline back to the suction side of the main control pump 1. To this basic circuit through which flows the entire oil in the case of equal rotations of both wheels, an auxiliary circuit is connected which links the distributor 2 to the auxiliary hydromotor 3 of the hydromotor-type flow distributor. Further, a pipeline with half oil pressure is branched from the distributor 8 connecting in parallel the second side of the auxiliary hydromotors 3, 4, whereby the first side of the auxiliary hydromotor 4 is connected by a pipeline shown by a dot-dash line in the diagram, through the distributor 7 to the return pipeline which connects the distributor 11 to the suction side of the main control pump 1. This connection between the two auxiliary hydromotors 3, 4 establishes a hydraulic differential which is necessary for the series connection of the driving hydromotors 20, 21 when driving in curves. For driving straight ahead the driving hydromotors 20, 21 are equally loaded. Thereby the auxiliary hydromotors 3, 4 of the hydromotor-type distributor on the side of the parallel pipe connections drawn in dash dot lines are exposed to an equal half-value force tending to rotate both hydromotors in the same direction. On the opposite connecting side, the auxiliary hydromotor 3 is connected to the pressure pipeline of the main control pump 1, whereby on this side the auxiliary hydromotor 3 is exposed to the opposed full force of the full pressure of the driving oil. In this way the resultant which tries to rotate the auxiliary hydromotor 3 acts with a force of half the pressure in the direction determined by the oil flow in the supply line shown by a solid line. On the opposite side the auxiliary hydromotor 4 is connected to the return pipeline drawn as a dotted line where the returning oil has a pressure of approximately zero. The resultant which tries to rotate the auxiliary hydromotor 4 thus acts with a force of half the pressure in the direction determined by the oil flow in the half-pressure pipeline (represented by a dash-dot line). In this way the auxiliary hydromotors 3 or 4, respectively, are exposed to equal opposed forces which try to rotate the two auxiliary hydromotors in opposite directions. For this reason the auxiliary hydromotors 3, 4 stand still, and there is no oil flow therethrough when the vehicle drives straight on.

When driving e.g. in a right-hand curve, the left-hand wheel must have a higher speed than the right-hand one. In this way the right-hand wheel and its driving hydromotor 20 are braked, while the left-hand wheel and its driving hydromotor 21 are additionally driven. The pressures in connecting pipelines of the auxiliary hydromotor 4 change in the manner that a greater pressure difference acts on this hydromotor due to increased pressure of the driving pipeline represented by a dash-dot line) which connects the auxiliary hydromotor 4 with the driving hydromotor 20. The hydromotor 4 starts to rotate and runs the hydromotor 3 which in this case operates as a pump and takes away oil from the pipeline connecting the hydromotor 3 through the distributor 8 to the connection line between the driving hydromotors 21, 20 supplying same on the other connection side through the pipeline represented by a solid line and through the distributors 2, 12 as an additional quantity to the driving hydromotor 21. Thereby the left-hand driving hydromotor receives more oil and begins to rotate faster which matches the curvature conditions when driving in a right-hand curve. The same oil quantity is removed from the right-hand hydromotor 20 which corresponds to the lower speed of this wheel upon turning of vehicles to the right.

When driving in high gear the control pump 5 belonging to the hydromotor-type distributor is short-circuited by the distributor 6. In the same way also the driving hydromotors 23 and 24 for the rear-axle wheels of the vehicle are short-circuited by distributors 9 or 10, respectively, so that these wheels are not driven in high gear.

The operation of the valve-type distributor 13 or 22, respectively, according to FIG. 3, the insertion of which into the hydraulic circuit of the hydrostatic drive arrangement for vehicles is shown in FIG. 2, is the following: When one of the wheels of an axle runs onto slippery ground and, consequently, sideslides, the wheel rotates faster than the speed corresponding to vehicle speed and curvature radius. As the driving hydromotor of this wheel also rotates faster than the hydromotor of the wheel on the opposed side of the axle, there are differing oil flows through the connection points 16/19 and 15/18 at stake due to throttling of the flows. The driving oil supplied to the valve-type distributor 13 or 22 by the hydromotor-type distributor 3, 4, 5 (FIG. 2) enters the opening of the connection point 14/17 (FIG. 3) which is fitted to the common casing 29 and divided between the left-hand 86 and right-hand chamber 85, wherefrom it enters through the channel 30 or 31 into chamber 48 or 51 and passes through grooves 74 or 75 made in the cylindrical head 56 or 57 of the movable shutter 58 or 59 and through an opening of the partition wall 54 or 55 into the chamber 49 or 52, respectively, which on its outer wall has the connection point 16/19 or 15/18 for the connection of a supply pipeline to the left-hand hydromotor 21 or 24 of the front or the rear axle and to the right-hand driving hydromotor 20 or 23 of the front or rear axles of the vehicle. At the partition wall 54 through which protrudes the cylindrical head 56 of the movable shutter there is a pipe connection 71 on one side of the wall and a pipe connection 70 on the other side of the wall, which are connected to the first chamber of a piston servomotor. At the partition wall 55 through which protrudes the cylindrical head 57 of the movable shutter there is a pipe connection 73 on one side of the wall and a pipe connection 72 on the other side of the wall, which are connected to the second chamber of the piston servomotor. When driving straight ahead, equal driving-oil quantities flow through each movable shutter 58 and 59 because both driving hydromotors, e.g. 20, 21 on the front axle, rotate with the same speeds. With equal flows through the two movable shutters the differences of pressure of both sides of shutters in pipe connections 71, 70 and 73, 72 are equal so that $$p_{71} - p_{70} = p_{73} - p_{72}.$$

Due to interconnection of the pipe connections 71, 70 or 73, 72 with compartments 119, 121 or 125, 123 the pressure differences of both sides of pistons 114 or 115 will be equal, hence:

$$p_{119} - p_{121} = p_{125} - p_{123}.$$

Thus the servomotor will stand still and thereby also the control piston 98 of the four-way distributor which is connected to the piston rod of the servomotor and held in its middle position by the helicoidal pressure spring 108. In this position the four-way distributor 33 blocks the inlet of the control oil through the connection 47 and through the chambers 106 and 107 and the channel 39 or 40 to which the chamber 90 or 91 of the control throttle distributor 32 is connected by the control pipeline 41 or 42 and the connection 44 or 45. The piston 82 of the distributor 32 in this case stands still in its middle position due to the opposed actions of springs 94, 95. This faciliates an unthrottled flow and a uniform distribution of the driving oil between the connection points 16/19 and 15/18.

In the case when one of the wheels, e.g. the one driven by the driving hydromotor 21 (FIG. 2), begins sidesliding because it happens to run up on mud, the flow of driving oil increases through the connection point 16/19 of the distributor 13. Therefore the flow through the movable shutter 58 is greater than that through the movable shutter 59. Thus a greater pressure difference arises on the shutter 58 than on the shutter 59 so that on pipe connections 71, 70 and 73, 72 the following ratio of pressures prevails:

$$p_{71} - p_{70} > p_{73} - p_{72}.$$

Therefrom there result the following pressure differences in the servomotor 34 in the compartments 119, 121 on the sides of piston 114 and in the compartments 125, 123 on the sides of piston 115:

$$p_{119} - p_{121} > p_{125} - p_{123}$$

when $$[(p_{119} - p_{121}) - (p_{125} - p_{123})] \cdot F > S,$$

where $F$ is the effective surface area of pistons 114 and 115 and $S$ is the force of the spring 108 of the distributor 33. The control piston 98 of the distributor moves to the right. Thereby a connection is established between the control-oil connection 47 and the connection channel 39 which by the control pipe 41 through the reversing valve 43 used for reversing drive is connected to chamber 90 of the control throttle distributor 32. In the formerly mentioned position of the control piston 98 the connection channel 40 remains connected to the connection 46 of the pipelines for the control-oil tank. This connection is realized through the chamber 107, the end chamber 104 and the connection channel between chamber 104 and the connection 46 and serves together with pipe 42 leading through the reversing valve 43 as a relief pipeline for the discharge of oil from chamber 91. In the position mentioned of the control piston 98 of the four-way distributor 33 the oil flows through connection 47 into the middle chamber 103; through chamber 106, channel 39 and control pipe 41 into chamber 90 of the control throttle valve 32, thereby pushing the piston 82 to the right. Consequently the tapered piston part 84 closes the distribution chamber 86 and reduces the flow through the channel 30 and the left-hand shutter 58 for such a time until the flows through both shutters 58, 59 or through connection points 16/19, 15/18 are balanced. Then the control piston 98 of the four-way distributor and the piston 82 of the control throttle distributor return to their middle position.

Differing numbers of revolutions of two wheels of the same axle when driving in a right-hand or left-hand curve are rendered possible by spring-loaded shutters 58, 59 which in the case of small differences of speeds and thus also of small differences of flows or pressures in the chamber 48, 49 or chamber 51, 52 move out of the middle position. In this way a larger cross-section of the groove 74 or 75 of the cylindrical head 56 or 57 of the movable shutter comes into zones of partition walls 54 or 55 faciliating a greater supply of driving oil through the connection point 16/19 or 15/18 and thereby to the driving hydromotors 21, 24 or 20, 23 of the left-hand or right-hand wheels according to a drive in a right-hand or left-hand curve. Due to insufficient sensibility thereby the servomotor 34, the four-way distributor 33 and the control throttle distributor 32 do not become effective for throttling this greater flow to one of the driving hydromotors of the wheel. These organs do not react before there arises a greater difference of rotational speeds of wheels, e.g. at sidesliding of one wheel on mud. At transition of the vehicle from the curve in straight on drive, the spring 64 or 65 automatically returns the pertinent movable shutter 58 or 59 into their middle position, whereby equal flows are again established through both shutters.

The operation of the hydromotor-type distributor 13' or 22' according to FIG. 4, the insertion of which into the hydraulic circuit of the hydrostatic drive arrangement for vehicles is shown in FIG. 2, is enough clear from the description of its design so further discussion thereof is unnecessary.

The flow distributor 13'' or 22'' with feeler pumps for the distribution of the hydraulic medium between the driving hydromotors of the front and rear axles, respectively, according to FIG. 5, the insertion of which into the hydraulic circuit is shown in FIG. 2, operates as follows:

The main variable-flow driving pump (not shown in FIG. 5) supplies by the pipeline through the connection point 14/17 driving oil to constant-flow hydromotor 204. The speed of said hydromotor only depends upon the oil quantity supplied by the pipe to connection point 14/17 (FIG. 2). The hydromotor 204 propels the control pump 205, the control mechanism of which is linked to the steering mechanism of wheels of the vehicle so that the magnitude and direction of deviation of the control mechanism of said pump depend upon the position of the steering gear of wheels of the vehicle. Besides, by the steering gear the direction of oil flow propelled through control pipelines (drawn in FIG. 5 by a dotted line) by the control pump 205 can also be changed by the change of the sense of rotation of hydromotor 204, arising at a change of flow direction of the driving oil through the hydromotor 204. In this case the main driving pump (not shown in FIG. 5) supplies driving oil through the connection pipe 203 into the driving hydraulic circuit shown in FIG. 5 by a thick solid, wherefrom the oil returns through the hydromotor and a pipe connected to the connection point 14/17 again to the main driving pump. The flow direction of the driving oil acts on the position of the piston of the direction distributor 206. When the driving oil arrives from the hydromotor 204 into the direction distributor 206, it pushes its piston into the end position and then flows through a by-pass pipeline with a nonreturn valve into a pipeline which splits into two branches one of which is connected through a throttle distributor 207 into the driving hydromotor 21 of the left-hand front wheel and the other branch into the driving hydromotor 20 of the right-hand front wheel. In the middle position of the piston of the throttle distributor the flow in both branches is not hindered in its way towards the driving hydromotors. When the piston of the distributor 207 moves to the right, it throttles the flow in the branch leading to the driving hydromotor 21, and when the piston moves to the left, it throttles the supply of the driving oil into the driving hydromotor 20. Behind the driving hydromotors 21 and 20 both branches of the driving pipeline unite and return through the connection line 203 to the main driving pump. In this way the driving hydromotors 20 and 21 are connected in parallel. The shaft of the driving hydromotor 20 or 21 is linked to the shaft of the feeler pump 211 or 210, respectively. When the constant-flow driving hydromotors are used, the feeler pumps should be of the constant-flow type, as well, when, however, variable-flow driving hydromotors are used, the feeler pumps can either be of the constant-flow or of variable-flow types.

As the shafts of pumps 210 and 211 rotate with the same speed as the shafts of driving hydromotors 21 and 20, the conditions in the pipe branches of the control circuit are similar to those in the driving circuit only at any lower pressure and with any smaller oil quantity. The pump 205 simulates differential operation and pumps oil from pipe branch 209 into pipe branch 208 or inversely, therewith balancing the oil flows which otherwise, when driving in a curve, would not be equal due to differing speeds of the driving hydromotors 21 and 20 and feeler pumps 210 and 211 which are linked thereto. When the wheels driven by the hydromotors 21 and 20 run correctly, i.e. so that neither of them slides, the pressures in the pipe branches 209 and 208 are equal. There exists no force acting upon the piston of the throttle distributor 7. In the case of sliding of any wheel, however, the pertinent feeler pump 210 or 211 would press into the pipe branch 209 or 208 a larger oil quantity than could be absorbed by the opposed feeler pump 211 or 210 in spite of the action of control pump 205. In this branch, consequently, an overpressure arises which is transmitted through the pipeline 212 or 213 to one of the piston sides of the throttle distributor 207. This piston moves from it middle position and begins to throttle the oil flow for the one driving hydromotor 21 or 20 the wheel of which sideslid. Due to the pressure drop the torque of the driving hydromotor diminishes by such an amount that the wheel ceases sliding. In this moment the pressures in pipe branches 209 and 208 of the control circuit are equalized and the piston of the throttle distributor 207 begins to return into its middle position. As soon as the wheel again reaches solid ground, the pressures of both driving hydromotors are equalized, while otherwise the cycle described is repeated. Throttles 222, 223, 224 and 225 are foreseen in order to switch off the control equipment when the vehicle or the machine attain such a speed which eliminates the danger of wheel sliding due to the reduction of circumferential forces. The flow direction of control oil for flow correction in the two pipe branches 209, 208 and in the pipeline 212 is shown by arrows drawn along these pipes, whereby the reference marks have the following meanings:

N.O.D. forward, right-hand curve
N.O.L. forward, left-hand curve
V.O.D. backward, right-hand curve
V.O.L. backward, left-hand curve In the case one of the wheels begins to slide its feeler pump absorbs a larger oil quantity than is supplied to it by the feeler pump of the opposed wheel. In order to prevent a vacuum in this pump, it draws oil from the tank 237 or 236 through pipe branches 226 or 227 or 228 or 229, respectively, which are equipped with non-return valves.

When the piston of the throttle distributor 207 is out of its middle position and the reason for sliding of a wheel eliminated, under the influence of a spring the piston returns to its middle position because the throttle 238 or 239 permits the return of oil from the distributor 207 or from the control circuit into the tank.

The relief valves 232 or 233 have the task of eliminating the operation of the entire arrangement as soon as the vehicle reaches a sufficient speed, thereby preventing an eventual operation of the throttle distributor 207 at high speeds and establishing an ideal parallel connection of driving hydromotors when there is no danger of wheel-sliding.

The tolerence of irregularities of running can be selected at will by the dimensions of throttles 239, 238. When driving a vehicle one must have in mind instantaneous changes of tire diameters due to shocks and varying axle loadings. For permanent replenishment of control oil in the equipment a supply line 241 is provided having two nonreturn valves inserted into the pipe interconnecting the two pipe branches 208, 209 of the circuit.

The hydrostatic drive arrangement for vehicles according to the invention has the advantage of an automatic adaptation of circumferential forces of any individual driven wheel of the vehicle when driving on a ground where hard soil with a goood adhesion of tires changes to soft sections which by their low friction coefficient present a weak support for the circumferential force of the driving wheel. Thus any sliding of any individual wheel is excluded and an optimum utilization of the circumferential force of any individual driving wheel ensured. This achievement is reflected by the great traction force of the vehicle, and it faciliates an optimum utilization of the driving engine of the vehicle at low speeds and great traction forces which could not be attained with drives known until the present and which is a weighty problem at today's state of the art. A further advantage of the drive arrangement according to the invention is a lower weight of the vehicle and less driving power of the engine needed, which factors all have an essential influence on the price of the vehicle. Beside the properties mentioned above the vehicle according to the invention has the advantage that the individual wheels at the adaptation to friction conditions at the same time also automatically adapt to curvature conditions. Thus the wheels most favorably utilize their circumferential forces on grounds having nonuniform friction coefficients when driving in curves without sliding because of differing speeds required for such driving. Thereby also the wear of tires is minimized.

It is, however, still within the frame of the invention if a valve-type distributor or a distributor with feeler pumps is used for flow distribution of the hydraulic medium between the groups of driving hydromotors of the front and rear axles of the vehicle.

We claim:

1. A hydrostatic drive for a vehicle having front and rear wheels, said drive comprising:
    respective hydraulic-motor means operatively connected to said front wheels and to said rear wheels for respectively driving same, each of said hydraulic-motor means including respective driving hydromotors connected to the corresponding right and left wheels, respectively;
    at least one main hydraulic pump connected in hydraulic circuit with said hydraulic-motor means for hydraulically energizing same;
    a hydromotor flow distributor connected in said circuit between said hydraulic-motor means and said main pump for the distribution of a hydraulic medium therebetween to adapt the rotary speeds of the individual wheels to road curvature encountered by said vehicle; and
    a respective further flow distributor including valve means connected between the drive hydromotors of each pair of right and left wheels, and between the respective hydromotors and the corresponding hydromotor flow distributor for individually adapting the circumferential force applied to each wheel to the respective road-wheel friction, said circuit including a respective primary hydraulic connection between said hydromotor flow distributor and each of said further flow distributors for supplying fluid to the latter, and a respective secondary hydraulic connection between each of said further flow distributors and the driving hydromotors of the corresponding pair of right and left wheels, said hydromotor flow distributor including:
        a respective constant-displacement hydraulic motor having an input connected to said main pump and an output communicating with a respective one of said primary connections;
        a hydraulic control pump having its opposite sides connected across the outputs of said constant-displacement hydraulic motors, said constant-displacement hydraulic motors and said control pump having respective shafts; and
        means mechanically connecting said shafts for joint operation thereof in a fixed predetermined relationship.

2. The hydrostatic drive defined in claim 1 for a vehicle having a low-speed, high-torque operating mode wherein the outlets of said driving hydromotors are connected in parallel through a valve-type distributor system.

3. The hydrostatic drive defined in claim 1 wherein said vehicle has an intermediate-speed, intermediate-torque operating condition, further comprising valve means shunted across said control pump in said operating condition.

4. The hydrostatic drive defined in claim 1 for a vehicle having a low-speed, high-torque operating mode, further comprising a four-way distributor connected to one side of said constant-displacement hydraulic motors and further valves distributors connecting the other side of said constant-displacement hydraulic motors to said driving motors of said front and rear wheels in parallel.

5. The hydrostatic drive defined in claim 4 wherein said vehicle has a steering mechanism, said drive further comprising a control valve connected across said control pump for selectively shunting same in response to operation of said steering mechanism.

6. The hydrostatic drive defined in claim 1 wherein said vehicle has an intermediate-speed, intermediate-torque condition, said drive further comprising a four-way distributor connected to said further flow distributor for operating said hydromotors in parallel.

7. The hydrostatic drive defined in claim 6, further comprising valve means for shunting the driving hydromotors of one of said pairs of wheels in said intermediate-speed, intermediate-torque condition of said vehicle.

8. The hydrostatic drive defined in claim 1 wherein said vehicle has a high-speed, low-torque condition, further comprising a four-way distributor connected to said hydromotor flow distributor, the pressure side of said main pump being connected to one side of one of said constant-displacement hydraulic motors via said four-way distributor in said condition, said drive further comprising another distributor connecting said main pump with one side of one of said driving hydromotors and the other side of said driving hydromotor in series through the other driving hydromotor of a respective pair of wheels, and means connecting the discharge side of the other driving hydromotor with the other of said constant-displacement hydraulic motors, said control pump being shunted in said condition.

9. The hydrostatic drive defined in claim 8, further comprising means for shunting the hydromotors of the other pair of wheels in said condition.

10. A hydrostatic drive for a vehicle having front and rear wheels, said drive comprising:
    respective hydraulic-motor means operatively connected to said front wheels and to said rear wheels for respectively driving same, each of said hydraulic-motor means including respective driving hydromotors connected to the corresponding right and left wheels, respectively;
    at least one main hydraulic pump connected in hydraulic circuit with said hydraulic-motor means for hydraulically energizing same;
    a hydromotor flow distributor connected in said circuit between said hydraulic-motor means and said main pump for the distribution of a hydraulic medium therebetween to adapt the rotary speeds of the individual wheels to road curvature encountered by said vehicle; and
    a respective further flow distributor including valve means connected between the drive hydromotors of each pair of right and left wheels, and between the respective hydromotors and the corresponding hydromotor flow distributor for individually adapting the circumferential force applied to each wheel to the respective road-wheel friction, said circuit including a respective primary hydraulic connection between said hydromotor flow distributor and each of said further flow distributors for supplying fluid to the latter, and a respective secondary hydraulic connection between each of said further flow distributors and the driving hydromotors of the corresponding pair of right and left wheels, each of said further flow distributors and the associated valve means comprising a feeler assembly sensing flow-pressure differences in the hydraulic medium at the hydromotors of the respective pair of wheels caused by slippage thereof for controlling the hydraulic fluid supply to said drive hydromotors, said feeler assembly comprising:
        a casing;
        throttle-valve means in said casing and including
        means defining a pair of valve seats communicating with the respective primary hydraulic connection,
        a pair of throttle-valve chambers respectively communicating with said seats, and
        a throttle-valve member shiftable for throttling the flow of hydraulic medium from each of said throttle-valve seats to the respective throttle-valve chambers in reciprocal senses; said chambers communicating with the respective secondary connections;
        a four-way spool-type distributor valve having a pair of outputs communicating with said throttle valve means and effective to bias said throttle-valve member in opposite directions, and a pair of inputs connected to a source of a control fluid;

reversing-valve means between said outputs of said distributing valve and said throttle-valve means; and a piston-type servomotor mounted on said distributing valve and connected thereto while communicating with said chambers for controlling said spool-type distributing valve.

11. The hydrostatic drive defined in claim 10 wherein said throttle-valve means includes a housing defining a valve bore formed with said seats and said chambers and slidably receiving said throttle-valve member, a space along said bore communicating in common with said seats and a channel between a respective primary connection and said space, said throttle valve member having a pair of valve heads tapered in the direction of the respective seats and cooperating therewith, and respective small-diameter portions on the ends of said member, said throttle-valve means further comprising spring means bearing on said member in opposite directions for centering same relative to said seats, said spring means including a coil spring surrounding each of said ends and bearing outwardly upon said casing and respective supporting plates seated against said springs and bearing upon said heads around said ends.

12. The hydrostatic drive defined in claim 10 wherein said servomotor includes a piston operatively connected to the spool of said distributor valve and formed with a pair of spaced-apart piston members, a servomotor housing surrounding said piston defining a pair of working chambers each slidably receiving one of said piston members and subdivided thereby into a pair of oppositely effective working compartments, and respective duct means connecting each pair of said working compartments to a respective one of said throttle-valve chambers for displacement of said piston in response to pressure differential created in the hydraulic medium of said throttle-valve chambers.

13. The hydrostatic drive defined in claim 10 wherein said spool-type distributing valve comprises a control piston having a central spool and a pair of outer spools spaced from said central spool;

a valve housing slidably receiving said control piston and formed with a central space communicating with a source of a hydraulic medium and a pair of further spaces respectively connected with said reversing valve and communicating selectively with said central space upon displacement of said central spool in either direction from an intermediate position of the control piston, said valve housing being further provided with a pair of outer spaces communicating with a reservoir of the hydraulic medium and with each of said further spaces respectively but blockable by said outer spools upon displacement of said control piston; and spring means acting upon said control piston for biasing same into said intermediate position upon displacement of said control piston by said servomotor.

14. The hydrostatic drive defined in claim 13 wherein said spring means includes a pair of shoulders formed on said control piston in axially spaced relation, a pair of support plates slidably mounted on said control piston between said shoulders and engageable with opposite walls of said valve housing, and a coil spring surrounding said control piston and seated against said plates, said valve housing defining an abutment engageable with said control piston to limit the displacement thereof in one direction.

15. The hydrostatic drive defined in claim 10 wherein said feeler assembly further comprises:

means on said casing defining a pair of control compartments respectively connected with said throttle-valve chambers and formed internally with respective partitions, said compartments each being connected on one side of a respective partition to the respective chamber and on the other side of the partitions to a respective one of said secondary hydraulic connections;

means hydraulically connecting the opposite sides of each of said partitions to said servomotor for biasing same in accordance with the pressure differential across said partitions;

respective throttle heads traversing said partitions for controlling the pressure differential developed thereacross, each of said heads being formed with an upstanding stem; and spring means cooperating with said stems for biasing said heads into intermediate positions relative to said partitions.

16. The hydrostatic drive defined in claim 15 wherein said servomotor comprises a piston rod connected with said spool and formed with a pair of spaced-apart piston members, and cylinder means surrounding said piston members and defining a pair of working chambers subdivided by said piston members into respective pairs of working compartments, said feeler means including first duct means communicating with said control compartments along the side of the partition connected with the associated throttle-valve chamber and communicating with the working compartments of said servomotor acting upon said piston members in opposite directions, and second duct means connected to said control compartments on the sides of said partitions remote from said throttle-valve chambers and connected to the remaining working compartments of said servomotor.

17. The hydrostatic drive defined in claim 15 wherein each of said heads is generally cylindrical and is formed with at least one longitudinal slot of a cross section increasing continuously outwardly from a relative small cross section centrally of the head.

18. The hydrostatic drive defined in claim 15 wherein each of said stems is provided with a pair of axially spaced shoulders and said spring means includes a coil spring surrounding each stem between said shoulders, and a pair of supporting plates forming seats for said coil spring and urged thereby against said shoulders, said casing being provided with further compartments receiving said spring means and having walls engageable with said plates while permitting displacement of said stems, the plate between said further compartment and said control compartment being provided with a bore for equalization of the pressure between said further compartment and the respective control compartment, said casing being formed with blind bores slidably receiving said stems remote from said heads, and respective passages connecting said blind bores and said further compartments for equalization of the fluid pressure therebetween.

* * * * *